May 19, 1970 — A. HAHN — 3,512,826
MOBILE FOOD SERVICE WAGON
Filed Dec. 9, 1968 — 2 Sheets-Sheet 1

INVENTOR
ARTHUR HAHN
BY
Seidel & Gonda
ATTORNEYS

May 19, 1970     A. HAHN     3,512,826
MOBILE FOOD SERVICE WAGON
Filed Dec. 9, 1968     2 Sheets-Sheet 2
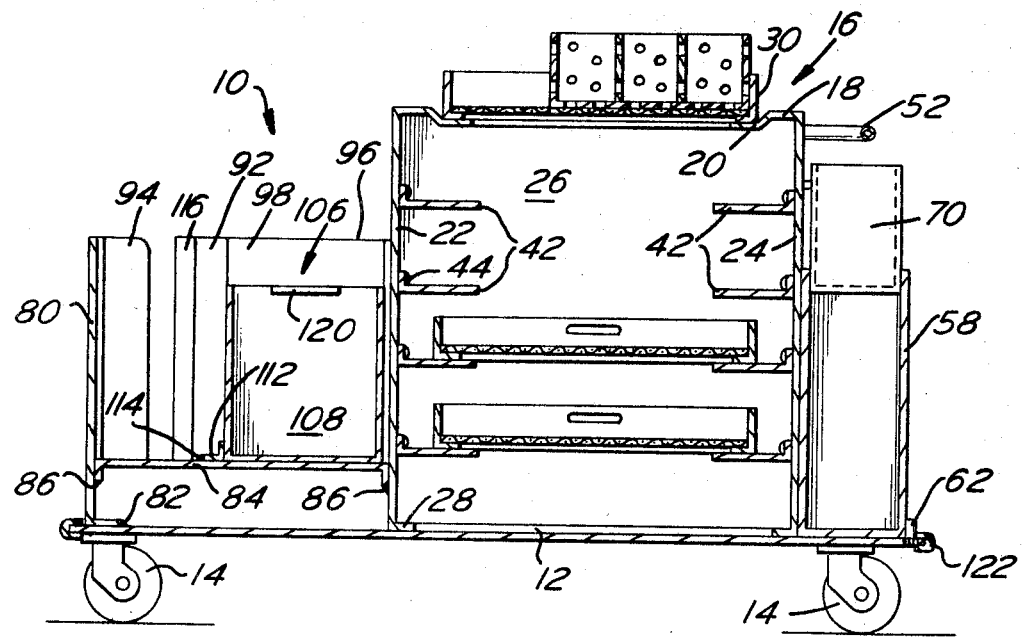
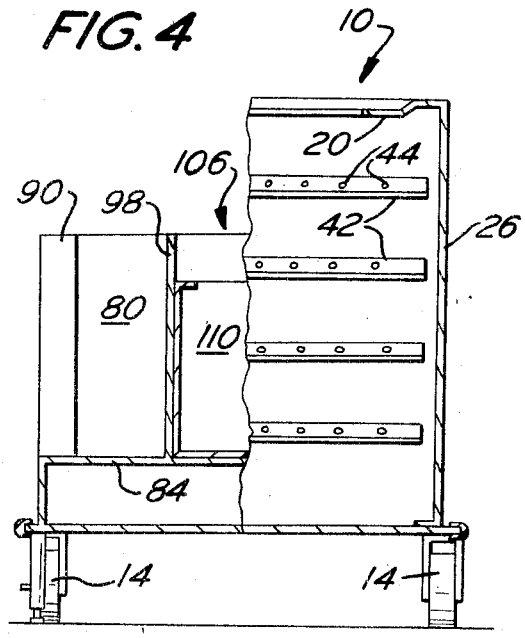
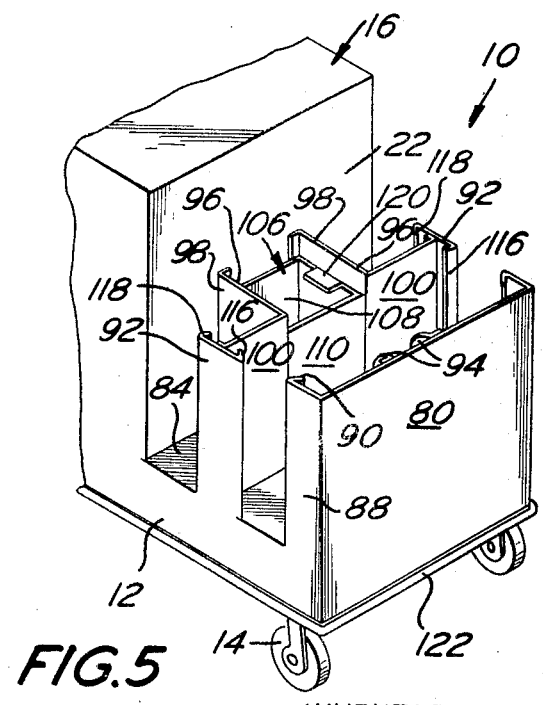
INVENTOR
ARTHUR HAHN
BY
Seidel & Gonda
ATTORNEYS.

United States Patent Office 3,512,826
Patented May 19, 1970

3,512,826
MOBILE FOOD SERVICE WAGON
Arthur Hahn, 4000 Ridge Pike, Collegeville, Pa. 19426
Continuation-in-part of application Ser. No. 672,911
Oct. 4, 1967. This application Dec. 9, 1968, Ser.
No. 783,780
Int. Cl. A47b 31/00; B60p 3/02
U.S. Cl. 296—22
10 Claims

ABSTRACT OF THE DISCLOSURE

A food service wagon is provided, having a frame mounted on wheels, and having a plurality of posts extending upwardly from the frame to define a plurality of openings for receiving dishes. Vertically disposed dividing walls adjacent the posts define an open-sided well. A receptacle for scrapings from the plates is provided, complemental with the well. One wall of the receptacle provides a lateral retaining means for dishes received in one of the openings. Another receptacle is provided on one side of the wagon for receiving other waste materials such as paper and/or linen, and a further receptacle for liquid refuse is provided, nested within the other receptacle, but readily removable therefrom.

This application is a continuation-in-part of my copending patent application Ser. No. 672,911, filed Oct. 4, 1967.

This invention is directed to a mobile food service wagon and more particularly to a mobile food service wagon which reduces the number of personnel needed to remove servings from tables and eliminates the necessity for providing service stands.

Conventionally, in restaurants, numerous service stations are provided to facilitate the removal of tableware, soiled linen, and the like. Usually, aluminum trays are provided at the service stations and plates, glasses, cups, and silverware are indiscriminately heaped upon the trays. Thereafter, the aluminum tray must be carried by personnel from the service station into the kitchen. Often, silverware is lost by being mixed with garbage on the trays. Furthermore, significant breaking and chipping of plates, glasses, cups, etc. occurs because of the indiscriminate piling of such materials on a service station tray.

A further undesirable result of utilizing a single tray at a service station is that garbage is constantly mixed in with the dishes and silverware since all materials remaining on the table are placed on a single tray.

It is an object of the present invention to provide a mobile food service wagon for use in a restaurant which overcomes the deficiencies above noted.

It is another object of the present invention to provide a mobile food service wagon which provides for rapid separation of silverware, trash, glasses and dishes in a neat manner.

It is still another object of the present invention to provide a mobile food service wagon which provides a stacking area for dishes.

It is a further object of the present invention to provide a mobile food service wagon having a removable receptacle for receiving scrapings from the dishes, the removable receptacle being received in and in part defining the stacking area for the dishes.

It is a further object of the present invention to provide a mobile food service wagon which facilitates draining of glassware, silverware and cups into a liquid refuse receptacle.

It is another object of the present invention to provide a mobile food service wagon wherein the liquid refuse receptacle is protectively nested within a larger receptacle intended for material such as paper or linen, the liquid refuse receptacle being readily removable for emptying and cleaning.

It is still another object of the present invention to provide a mobile food service wagon which is attractive in appearance and which can be used in all types of restaurants.

It is yet a still further object of the present invention to provide a mobile food service wagon which can be used for filling service stands with a supply of new silverware, glasses, dishes, etc.

Other objects will appear hereinafter.

The foregoing and other objects are accomplished, in a preferred form of the invention, by a mobile food service wagon provided which has a frame including a base member mounted on wheels. A plurality of posts and a pair of spaced vertically disposed walls extend upwardly from the base and define various size openings therebetween. The openings are adapted to receive various size dishes. Also, the opening between the spaced walls is adapted to receive a receptacle, the receptacle having a wall partially defining one of the dish-receiving openings.

Another receptacle is removably attached to the wagon at one end thereof. Yet another receptacle is at least partially nested within the other receptacle, and removably attached to the wagon.

For the purpose of illustrating the invention, there is shown in the drawings a form which is presently preferred; it being understood, however, that this invention is not limited to the precise arrangements and instrumentalities shown.

FIG. 3 is a section view taken along line 3—3 of FIG. 2;

FIG. 4 is a section view taken along line 4—4 of FIG. 2; and

FIG. 5 is a partial perspective view showing one end of a mobile food service wagon in accordance with the invention.

Figure 1:
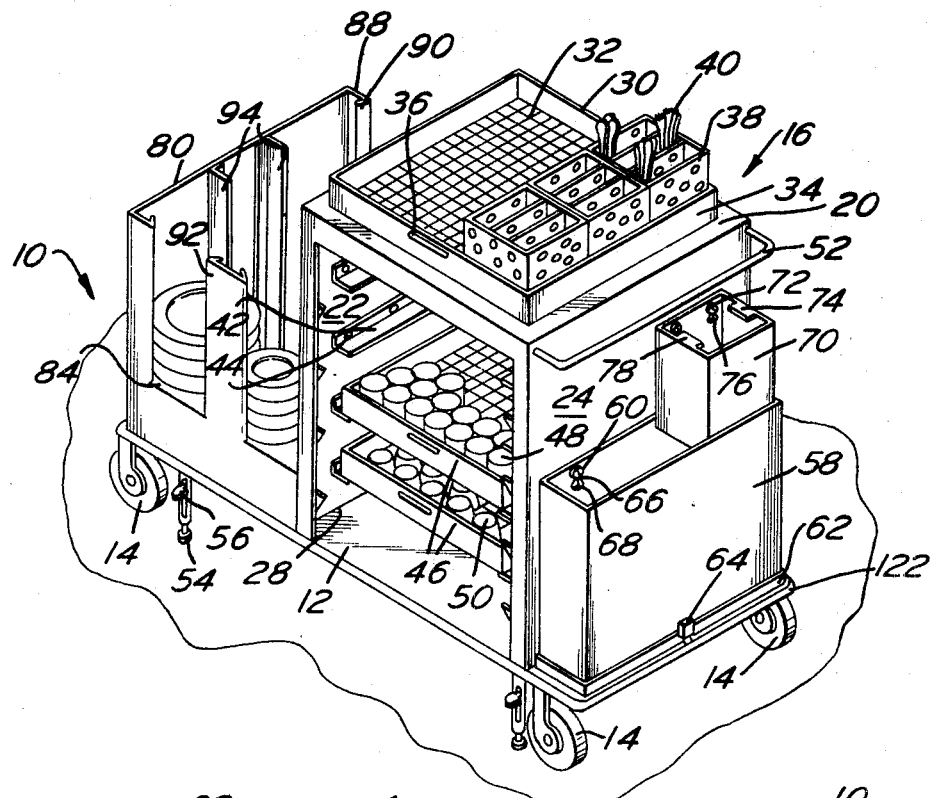
FIG. 1 is a perspective view of a mobile food service wagon partially loaded and constructed in accordance with the present invention.
Figure 2:
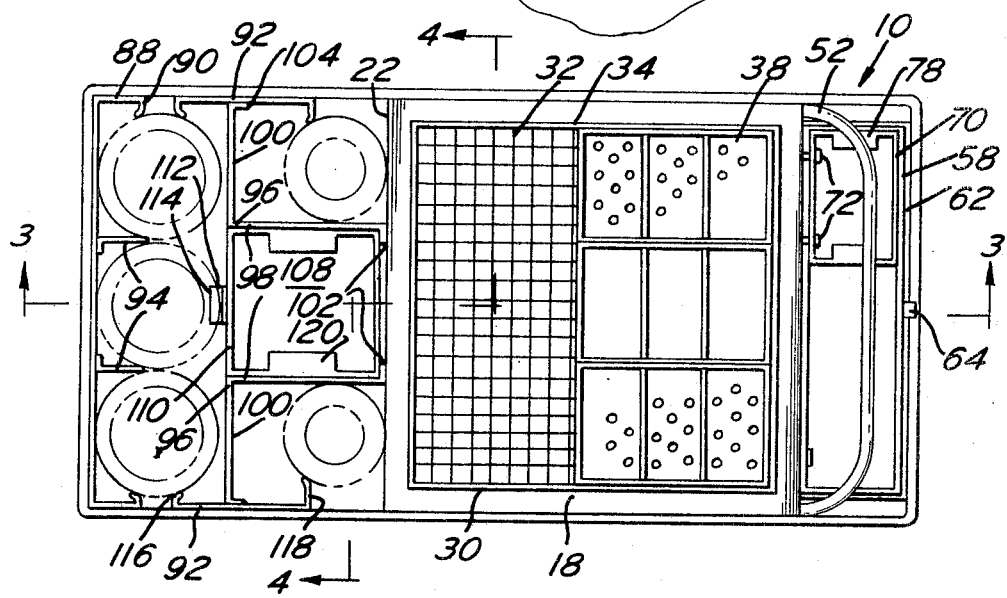
FIG. 2 is a top plan view of FIG. 1.

Referring now to the drawings in detail wherein like reference numerals indicate like elements throughout several views, there is set forth in FIGS. 1–5 a mobile food service wagon indicated generally by the reference numeral 10.

The wagon 10 has a frame including a base member 12, which has wheels 14 secured thereto. Thus, the wagon 10 is readily movable to any desired location. An inverted U-shaped housing 16 is supported on the base 12. Referring now to FIG. 3, the housing 16 includes a top 18 having a centrally located depression 20 therein. The housing 16 has side walls 22 and 24. The housing 16 may be provided with a back wall 26. Alternatively, the back of the housing 16 may be substantially open to facilitate the removal of trays from either the front or back of the housing as will be set forth in detail hereinafter. The front of the housing 16 is substantially open. A flange 28 extends around the base of the housing 16 and facilitates secure interconnection of the housing 16 to the base 12. The flange 28 can be secured to the base 12 by means of rivets, bolts, or the like.

The depressed portion 20 in the top 18 of the housing 16 provides a recess for receipt of a tray 30. The tray 30 may be received within such recess.

The tray 30 may be of any well-known construction. For example, the tray 30 may have a screen mesh base 32 and upstanding walls 34. Alternatively, the tray 30 may be constructed of perforated sheet metal or of plastic. The tray 30 is provided with slots 36 to facilitate rapid removal of the tray from the recess defined by the depressed portion 20 of the housing 16.

Receptacles 38, for receiving silverware 40 or the like, may be received in the tray 30.

L-shaped flanges or guides 42 are secured to the side walls 22 and 24 of the housing 16. Suitable fastening means 44, such as rivets, bolts or the like, may be utilized to secure the guides 42. Trays 46 are adapted to be received upon and supported by the guides 44. The trays 46 may be identical to the tray 30 in all respects. The trays 30 and 46 are preferably the type which are utilized in automatic dishwashing apparatus. Hence, the trays 30, 46 may be readily removed from the wagon 10 and placed in a dishwasher, or vice versa. The trays 46 may receive glasses 48, cups 50, or the like.

A handle 52 is suitably secured to the exterior surface of the top of the housing 16, and facilitates movement of the wagon 10. Also, when it is desired to locate the wagon 10 in a stationary position it is merely necessary to lower the foot actuable stops 54 to their lowermost position. An abutment 56 is provided on the stops 54 to permit the stops to be easily lowered by the foot of an operator. The stops 54 extend slightly beyond the lowest reach of the wheels 14 and thus prevent the wheels from engaging the ground and also prevent the wagon from rolling. To release the stops 54 it is merely necessary for an operator to slightly rotate the abutment 56 and permit the stops 54 to be raised by a spring contained therein. Stops 54 are conventional and need not be further discussed herein.

A receptacle 58 is removably attached to the outside of side wall 24 of the housing 16. Screws or bolts 60 may extend from the outside of wall 24 to provide support for the receptacle 58. The base 12 extends beyond the wall 24 of the housing 16, and also provides support for the receptacle 58. An upstanding flange 62 is secured to the base 12, and prevents the receptacle 58 from shifting from its desired position. A toggle fastener 64 of conventional construction may also be provided to connect the receptacle 58 to the flange 62. The receptacle 58, in a preferred form, has slots 66 therein which cooperate with the screws 60. The slots 66 have enlarged portions 68 which facilitate rapid removal of the receptacle 58 from the wagon 10. It is readily seen that the receptacle may be positioned against the outside wall 24 of the housing 16 so that the screws 60 extend through the enlarged portions 68 of the slots 66, and is thereafter dropped into position so that narrower portions of the slots 66 prevent the receptacle 58 from pivoting about the flange 62. Hence, an effective and rapidly removable interconnection between the receptacle 58 and the wagon 10 is provided.

Also removably attached to the outside of the side wall 24 is a receptacle 70. Screws or bolts 72 may extend from the side wall 24. Also, the receptacle 70 may be provided with slots 74, which cooperate with the screws 72. Slots 74, in a preferred form, include enlarged portions 76.

The width of the receptacle 70, measured between its outer faces, is preferably less than the width of the opening in the receptacle 58. Thus, the receptacle 58 provides, in effect, a protective shield about the bottom of the receptacle 70, to prevent accidental disconnection of the receptacle 70 upon contact with fixed objects such as tables, chairs, or the like.

The receptacle 70 may be coupled to the wagon 10 as follows: The lower end of the receptacle 70 is placed in the opening of the receptacle 58; the heads of the screws 72 are passed through the enlarged portions 76 of the openings 74; finally, the receptacle 70 is lowered so that the screws 72 rest in narrower portions of the slots 74. The receptacle 70 is now securely coupled to the wagon 10, and protected from inadvertent separation. Intentional removal, on the other hand, may be accomplished simply by reversing the above-described procedure. Handles 78 may be provided on the receptacle 70 to facilitate lifting.

An upstanding end wall 80 is connected to the base 12 of the wagon 10. Referring to FIG. 3, the end wall 80 may be connected to the base 12 by a weld 82 or the like. A shelf member 84 is connected, at one end, to the end wall 80, and at the other end, to the side wall 22 of the housing 16. The shelf member 84 may be connected to the end wall 80 and the side wall 22 of the housing 16 by welds 86 or the like.

The end wall 80 has extensions 88 extending in a direction perpendicular thereto. Inwardly directed chordal segments 90 are integrally connected to the extensions 88 for a purpose which will become clear hereinafter. L-shaped flanges 94 also extend upwardly from the shelf member 84 and are secured to the end wall 80. The posts 92 may be welded to the shelf member 84, or secured by any other suitable means. Also, the flanges 94 may be secured to the end wall 80 by welding or other means.

Upwardly extending wall members 96 are also secured to the shelf member 84. The wall members 96, which form an important part of the present invention, are best seen in FIGS. 2 to 5. The wall members 96 include first portions 98 extending generally parallel to the sides of the wagon 10, and generally at right angles to the side wall 22 of the housing 16. Also, the wall members 96 include second portions 100, disposed generally at right angles to the first portions 98. In the illustrated embodiment, the first portions 98 are secured, by welds 102 or the like, to the side wall 22 of the housing 16. The second portions 100 are secured, by welds 104 or the like, to the posts 92. Bottom portions of the wall members 96 may be secured to the shelf member 84.

The first portions 98 of the wall members 96 define therebetween a well, designated generally by the reference numeral 106, for receiving a receptacle 108. In a preferred form, the receptacle 108 is so dimensioned that when the receptacle 108 is received in the well 106, a wall 110 of the receptacle 108 is approximately flush with the respective second portions 100 of the wall members 96. Thus, the second portions 100 and wall 110 of the receptacle 108 form a continuous transverse wall extending substantially across the shelf member 84. A flange 112, seen in FIGS. 2 and 3, may be secured to the shelf member 84 by a weld 114. The flange 112, it will be seen, serves to prevent sliding of the receptable 108 out of the well 106.

Referring again to FIGS. 2 and 5, the above-described posts 92 are provided with inwardly directed segments 116 and 118. The segments 116 of the posts 92, segments 90 of the extensions 88, portions of the end wall 80, and edges of the flanges 94 cooperate to define areas for stacking relatively large dishes. Also, portions of the end wall 80, the flanges 94, and the wall 110 of the receptacle 108 define yet another area for stacking relatively large dishes. The segments 118, portions of the side wall 22 of the housing 16, and first portions 98 of the wall members 96 define areas wherein smaller dishes may be stacked.

The receptacle 108 is intended to receive scrapings from plates. Its location, it will be noted, is ideally suited to this function. The location of the receptacle 108 effectively minimizes handling of plates to be stacked. Moreover, it will be noted, the receptacle 108 itself forms an important structural element of the plate stacking areas.

The recepacle 108 may be provided with handles 120 to facilitate its removal from the well 106 for emptying and cleaning. Removal is accomplished by simply lifting the receptacle 108 above the upper limits of the wall members 96.

A guard 122 which may be composed of plastic, rubber or the like, may be attached to the base 12 around the entire periphery thereof. The illustrated guard 122 has a generally C-shape and is frictionally retained on the base 12. The guard 122 prevents damage should the wagon 10 be accidentally pushed against a fixed obstruction.

In the preferred use of the wagon 10, the receptacle 58 provides a means for receiving paper, linen and the like. The receptacle 70 provides a means for receiving liquid refuse, such as water. The receptacles 58 and 70 may be readily removed from the wagon 10 for emptying and cleaning.

The present invention may be embodied in other specific forms without departing from the spirit or essential attributes thereof and, accordingly, reference should be made to the appended claims, rather than to the foregoing specification as indicating the scope of the invention.

I claim:

1. A mobile food service wagon comprising a frame including a base mounted on wheels, a housing fixedly secured to said base for receiving and supporting trays therein, a plurality of upwardly extending members supported by said base, a pair of upwardly extending wall members supported by said base and interconnecting a pair of said upwardly extending members and said housing, portions of said wall members defining a well therebetween, and a receptacle removably received in said well, said upwardly extending members, said wall members and a portion of said receptacle defining therebetween stacking areas for dishes.

2. A mobile food service wagon in accordance with claim 1, including a shelf member supported by said base, said upwardly extending members and said pair of wall members being coupled to said shelf member.

3. A mobile food service wagon in accordance with claim 1, said housing having side walls and a top wall, a receptacle removably connected to the exterior of one of said side walls of said housing, and a further receptacle having a lower end thereof nested within said last-mentioned receptacle, said further receptacle being removably connected to the exterior of said one of said side walls of said housing.

4. A mobile food service wagon in accordance with claim 1, said housing having side walls and a top wall, said side walls extending transversely of said base, said upwardly extending wall members having first portions coupled to one of said side walls of said housing and extending generally at right angles thereto, and second portions disposed generally at right angles to said first portions and coupled to a pair of said upwardly extending members, first portions of said upwardly extending wall members being juxtaposed to define said well.

5. A mobile food service wagon in accordance with claim 4, and said receptacle having a side wall disposed substantially flush with said second portions of said upwardly extending wall members when said receptacle is in said well, whereby said second portions and said side wall of the receptacle define a continuous wall when said receptacle is in said well, and means on said base for retaining said receptacle in said well.

6. A mobile food service wagon in accordance with claim 5, wherein one of said upwardly extending members in an end wall juxtaposed to the wall defined by said second portions and said side walls of the receptacle.

7. A mobile food service wagon in accordance with claim 6, including generally vertically disposed flanges coupled to said end wall extending toward said wall defined by said second portions and said side wall of the receptacle, an said end wall and the pair of upwardly extending members to which said second portions of said upwardly extending wall members are coupled having inwardly extending segments thereon adapted to contact dishes in said stacking areas.

8. A mobile food service wagon in accordance with claim 4, wherein said receptacle includes handle means whereby said receptacle may be removed from said wells.

9. A mobile food service wagon comprising a frame including a base mounted on wheels, a housing fixedly secured to said base for receiving and supporting trays therein, said housing having side walls and a top wall, said side walls extending transversely of said base, a plurality of upwardly extending members supported by said base, a pair of upwardly extending wall members supported by said base and interconnecting a pair of said upwardly extending members and said housing, said upwardly extending wall members comprising first portions coupled to one of said wide walls of said housing and extending generally at right angles thereto, and second portions disposed generally at right angles to said first portions and coupled to said pair of said upwardly extending members, the first portions of said upwardly extending wall members being juxtaposed to define a well therebetween, and a receptacle removably received in said well, said upwardly extending members, said wall members and a portion of said receptacle defining therebetween stacking areas for dishes.

10. A mobile food service wagon in accordance with claim 9, wherein one of said upwardly extending members is an end wall juxtaposed to said second portions of said upwardly extending wall members, generally vertically disposed flanges coupled to said end wall and extending toward said second portions, and said end wall and said pair of upwardly extending members to which said second portions of said upwardly extending wall members are coupled having inwardly extending segments thereon adapted to contact dishes in said stacking areas.

References Cited

UNITED STATES PATENTS

| 2,784,999 | 3/1957 | Hunt | 296—22 |
| D. 174,957 | 6/1955 | Hunt | 296—22 |
| D. 186,657 | 11/1959 | Blickman | 296—22 |

FOREIGN PATENTS 435,595  5/1948  Italy.

PHILIP GOODMAN, Primary Examiner

U.S. Cl. X.R.

211—126